United States Patent Office 3,397,790
Patented Aug. 20, 1968

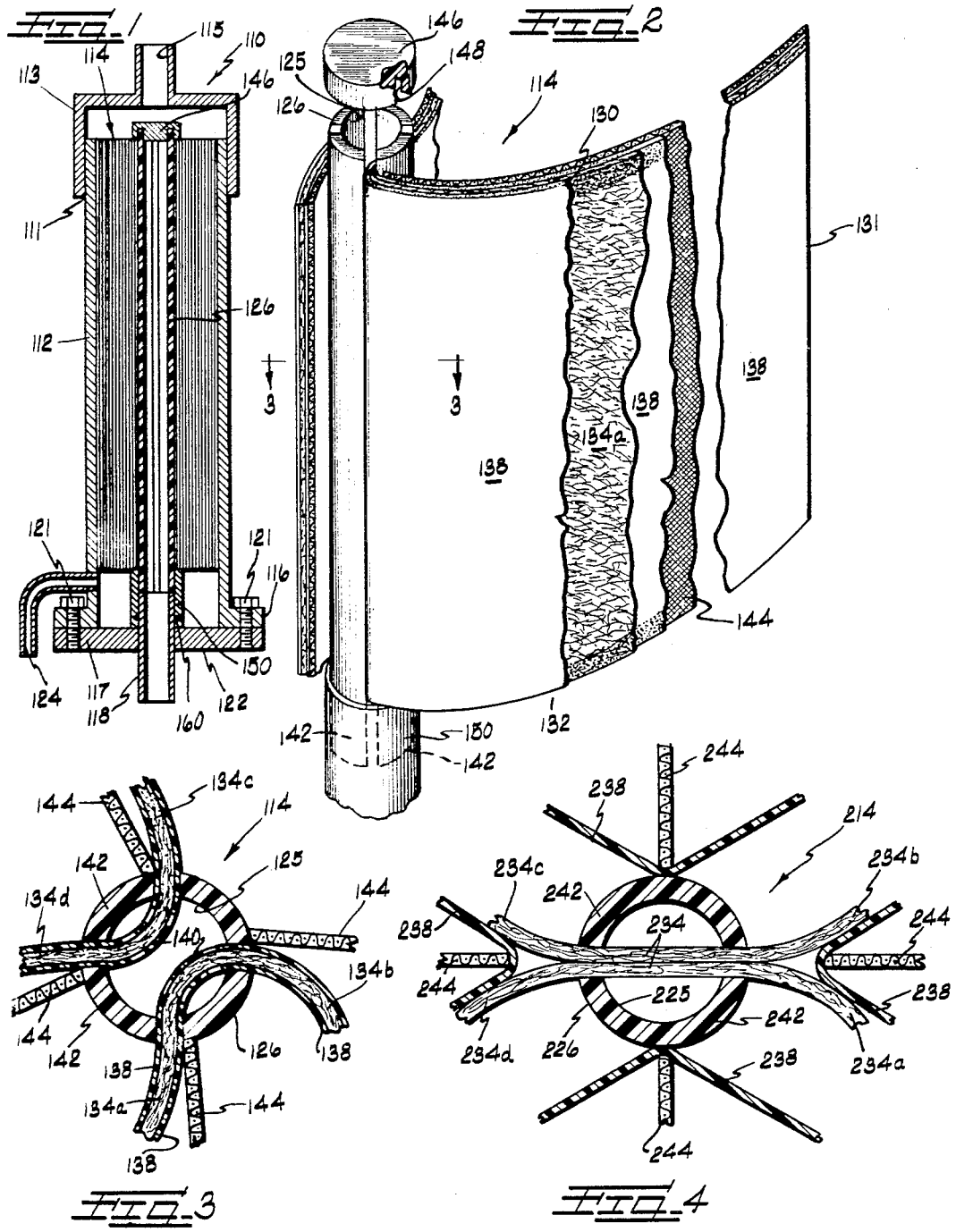

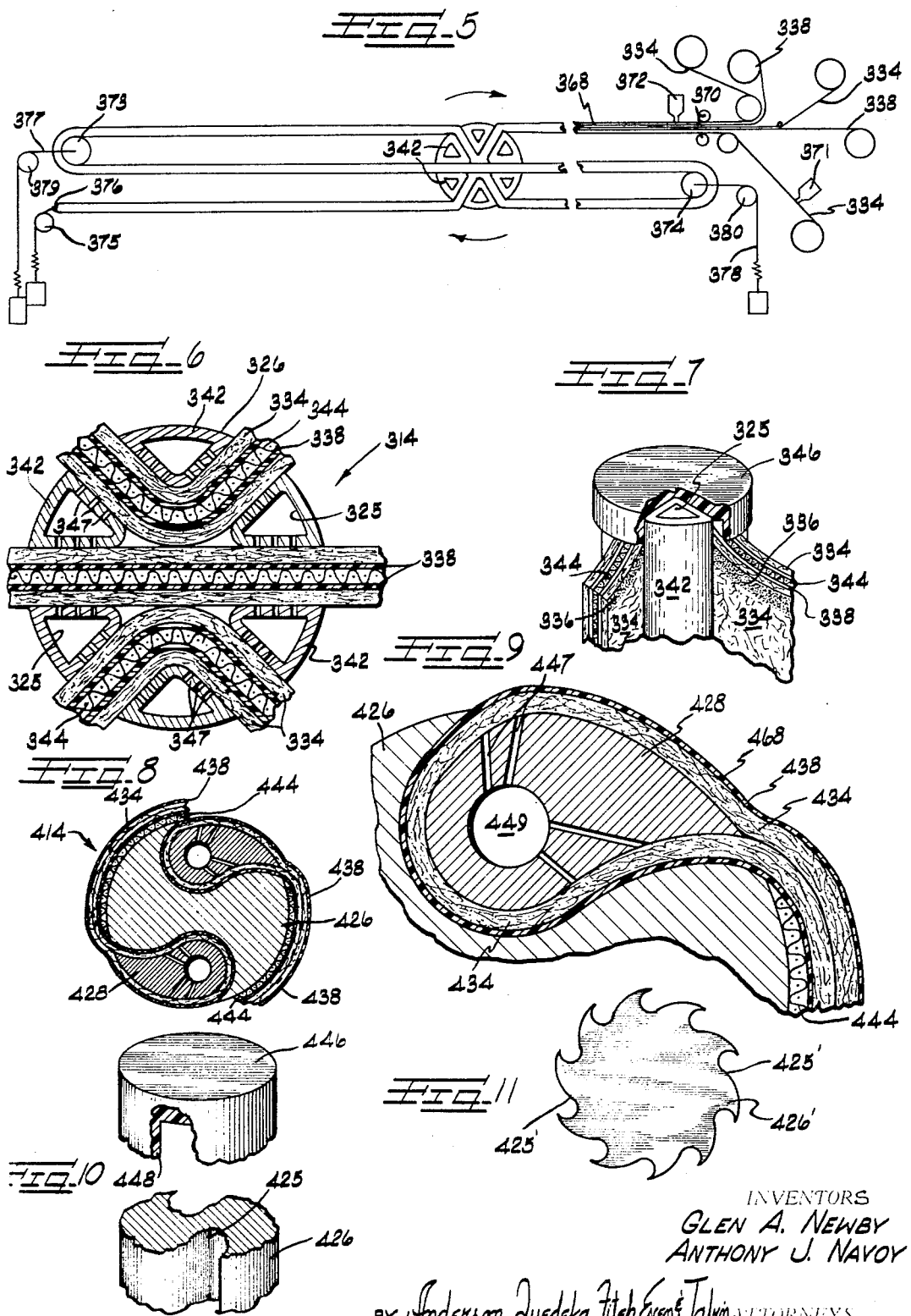

3,397,790
SEMIPERMEABLE MEMBRANE SEPARATION DEVICES AND METHODS OF MAKING THE SAME
Glen A. Newby, Del Mar, and Anthony J. Navoy, San Diego, Calif., assignors, by mesne assignments, to Gulf General Atomic Incorporated, San Diego, Calif., a corporation of Delaware
Filed Feb. 25, 1966, Ser. No. 529,993
25 Claims. (Cl. 210—321)

ABSTRACT OF THE DISCLOSURE

Semipermeable membrane separation devices particularly designed for production line manufacture. Devices which employ sheets of separator material, semipermeable membranes, and backing material spirally wound about a central mandrel are disclosed wherein the backing material sheet or a sandwich of backing material between sheets of semipermeable membrane extends through the mandrel, which may be formed by a plurality of segments connected together to form a tube. Mandrels may be made of a plurality of individual tubes each of which has its own axial passageway. Alternately, a mandrel is provided with peripheral teardrop shaped cavities, into each of which is fitted a similarly shaped insert that is a part of a subassembly including semipermeable membrane and backing material. Disclosed are methods suitable for production line formation of membrane modules of this general type utilizing such laminates.

---

This application relates to separation apparatus and to methods for making same, and more particularly to improved apparatus for separating a first fluid component from a fluid mixture of the first fluid component and a second component and to improved methods for making such appartaus.

It is known to employ semipermeable membranes to separate components from various fluid mixtures. For example, semipermeable membranes are employed to separate liquid components from a mixture of liquids, to separate gaseous components from a mixture of gases, and to separate liquid solvents from a liquid solution of a liquid solvent and a dissolved solute. With the growing recognition of the worldwide shortage of fresh water, considerable work has fairly recently been done to produce fresh water from sea water or brackish water employing semipermeable membranes which are often termed reverse osmotic membranes. Although the natural tendency of osmosis causes a solvent in a liquid solution to flow from the lower concentration of solute to the higher concentration of solute, the application of hydraulic pressure in excess of the osmotic pressure of the semipermeable membrane reverses the direction of flow and, depending upon the operating conditions and the particular membranes employed, can be used to cause fresh water of significantly lower salt or solute content to pass through the membrane to the lower pressure side.

Recently, semipermeable membranes have been developed made of organic polymeric materials, such as cellulose acetate, which have proved to have good osmotic characteristics for the production of fresh water from saline water. These semipermeable membranes are sometimes referred to as dual layer membrane because they include a very thin active surface layer in combination with a thicker porous layer. These dual layer membranes and methods for their production are described in detail in Bulletins PB 166395 and PB 181571 of the Office of Saline Water of the United States Department of the Interior, which bulletins are available from the U.S. Department of Commerce. Although originally believed to have been developed particularly for operation in a wet state for the separation of fresh water from saline water, it has now been found that these dual layer osmotic membranes can be freeze-dried without detriment to their osmotic properties, as described in detail in pending U.S. paent application Ser. No. 472,304, filed July 15, 1965 and assigned to the assignee of the present application. In addition, it has been found that these freeze-dried membranes can be employed to economically effect the separation of gaseous components from a gaseous mixture, as described in detail in pending U.S. patent application Ser. No. 559,823, filed in the name of Ulrich Merten, on June 23, 1966, and assigned to the assignee of the present application.

In the use of semipermeable membranes for the separation of fluid components from fluid mixtures, one of the operating parameters which affects the amount of throughput which is obtained using a given membrane is the total surface area of membrane which is in contact with the high pressure fluid feed mixture, all other operating conditions being equal, a larger area membrane will pass more of the permeating fluid component than a membrane of lesser area. Accordingly, for a separation apparatus employing semipermeable membranes to have a high capacity, it is important to incorporate a large amount of surface area of semipermeable membrane which will be in contact with the feed fluid mixture in a given volume. Obviously, the thinner semipermeable membranes that can be operatively employed, the greater amount of surface area that can incorporated in a given volume.

To obtain large amounts of semipermeable membranes surface area in a compact separation apparatus, it is known to employ a central mandrel containing an axially extending collection passageway and to spirally wrap around this mandrel a series of overlying sheets, such as two sheets of semipermeable membrane material sandwiching therebetween a sheet of backing material (which backing material provides a flow passageway in the plane thereof for the fluid component permeating through the semipermeable membranes) and to dispose another flow-passageway providing sheet between spiral windings of the semipermeable membranes, which sheet provides a passageway in the completed spiral wound assembly through which the feed mixture can be conveniently supplied to the surfaces of the semipermeable membranes, as by pumping the fluid feed mixture therethrough in a direction generally parallel to the axis of the central mandrel. This assembly of central mandrel and spirally wound sheets is sometimes termed a membrane module, and is hereinafter so preferred to. In operation, the fluid component which permeates from the feed mixture through the semipermeable membranes enters the backing material and flows in the plane thereof spirally inward to the axial pasageway in the central mandrel, with which passageway it is in fluid communication. Separation apparatus this general type is described in pending U.S. patent applications Ser. No. 419,881, filed Dec. 21, 1964 and Ser. No. 441,591, filed Mar. 22, 1965, both of which are assigned to the assignee of the present application.

Although the separaton apparatus disclosed in these two patent applications above have many advantages, improved versions of separation apparatus employing semipermeable membranes are always desired. Moreover, improved methods for making economically fabricating apparatus of the above type are always of interest, especially those methods which lend themselves to mass production techniques. These considerations are of special importance in providing separation apparatus designed to produce fresh water wherein it is important for the cost per gallon of the water produced to be competitive with other alternative methods of production of fresh water from sea water or brackish water.

It is an object of the present invention to provide improved separation apparatus employing semipermeable membranes and to provide an improved method for making same. It is another object to provide apparatus for separating a first fluid component from a fluid mixture of the first fluid component and a second component employing semipermeable membranes which apparatus has improved assembly and operating characteristics. It is a further object to provide an improved membrane module for separation apparatus which membrane module employs sheets of semipermeable membranes. A still further object is to provide an improved membrane module of the above type having a simplified design which is capable of economical fabrication. Yet another object is to provide an improved method for fabricating membrane modules for separation apparatus employing semipermeable membranes which method is adapted to mass production techniques. A still further object is to provide an improved membrane module which is especially suitable for use in a separation apparatus designed to separate water from an aqueous solution via reverse osmosis so as to either recover fresh water from saline water or to concentrate a desired aqueous solution. These and other objects of the invention are more particularly set forth in the following detailed description and in the accompanying drawings wherein:

FIGURE 1 is a diagrammatical cross section view of separation apparatus embodying various features of the invention;

FIGURE 2 is an enlarged fragmentary exploded perspective view particularly illustrating the membrane module shown in FIGURE 1 in an unwound condition with parts broken away;

FIGURE 3 is an enlarged horizontal cross sectional view taken generally along line 3—3 of FIGURE 2, showing the membrane lay-up as seen during an initial step in the fabrication of the membrane module;

FIGURE 4 is a view similar to FIGURE 3 of an alternate embodiment of a lay-up for a membrane module embodying various of the features of the invention;

FIGURE 5 is a diagrammatic elevational view of another alternate embodiment of a membrane lay-up, which view is illustrative of a method of making such a membrane module embodying various of the features of the invention;

FIGURE 6 is an enlarged fragmentary view, similar to FIGURES 3 and 4, of the membrane lay-up illustrated in FIGURE 5;

FIGURE 7 is a perspective view, generally similar to FIGURE 2, with parts broken away illustrating the membrane module shown in FIGURES 5 and 6 with an upper cap installed;

FIGURE 8 is a horizontal sectional view with parts broken away of still another alternate embodiment of a membrane module having various of the features of the invention;

FIGURE 9 is an enlarged fragmentary view of FIGURE 8;

FIGURE 10 is an exploded perspective view, reduced in size, of the mandrel substructure shown in FIGURE 8 together with an upper cap; and FIGURE 11 is a plan view of amodified version of the mandrel substructure shown in FIGURE 10.

Very generally, the invention provides an improved membrane module for use in separating a first fluid component from a fluid mixture of the first fluid component and a second component employing semipermeable membranes and apparatus for utilizing such a membrane module. In addition, an improved method for making such membrance modules is also provided. Briefly, the improved membrane module comprises a mandrel having an axial passageway or a plurality of axial passagewys, which mandrel is spirally wrapped with sheets of semipermeable membranes and associated sheets of porous backing material and sheets of feed passageway providing means. Inasmuch as the spirally wound sheets are variously connected to or disposed adjacent the mandrel before they are spirally wound therearound, these sheets are variously referred to as leaves and as extending generally radially outward from the mandrel. It should be understood, however, that a single sheet may pass through the mandrel and thus constitute two or more leaves because, in its assembled condition, it emanates from a point at or near the periphery of the mandrel at a plurality of locations. One of the features of the module is that the porous flow-passageway providing leaves extend into the axial passageway means in the mandrel to thereby provide good fluid communication between the axial passageway means and the generally radially or spirally extending flow passageways, which in operation are the passageways for the fluid component that is separated from the fluid mixture via permeation through the semipermeable membranes.

As used in this application, the term "semipermeable" includes membranes which exhibit osmotic properties and are particularly adapted for the separation of solutions including a liquid solvent and a solid which is dissolved therein as a solute, as well as the various semipermeable membranes known in the art which are useful for separating mixtures of gases or mixtures of liquids. The term "mixture" as used in this application includes mixtures of liquids regardless of their mutual solubility, mixtures of different gases, and solutions wherein a mixture of a solid and a liquid results in the dissolution of the solid as a solute in the liquid, as well as combinations of the foregoing.

Illustrated in FIGURE 1 is a separation unit 110 embodying various of the features of the invention which unit includes a high pressure generally cylindrical chamber 111 fabricated from an outer shell 112 having a cap 113 secured to its upper end, an improved membrane module 114 disposed within the chamber 111, and a fluid takeoff assembly 122 at the bottom end of the chamber 111. The cap 113 is formed with an inlet 115 through which the feed solution is supplied to the chamber 111. A side outlet pipe 124 permits outflow from the chamber 111 of the feed mixture after it has passed through the module 114.

The hollow cylindrical shell 112 has a peripheral flange 116 at its lower end by which connection is made to the fluid takeoff assembly 122. The fluid takeoff assembly 122 includes a circular plate 117 having a pipe 118 extending through a central hole therein. A coupling ring 150, such as a piece of plastic tubing, connects the upper end of the pipe 118 to the membrane module 114 in a manner discussed further hereinafter. A means is provided to seal the chamber. One such arrangement employs bolts 121 to secure the lower flange 116 to the circular plate 117, and a suitable peripheral gasket (not shown) may be employed to assure a fluid-tight seal.

Generally, the module 114 includes a central mandrel 126 having an axial passageway 125 formed therein. As best seen in FIGURES 2 and 3, the module 114 includes a plurality of sheets or layers of backing material 134, a plurality of sheets of semipermeable membranes 138 and a plurality of separator grids 144. In the particular illustrated example, two sheets of backing material 134 are employed, both of which extend into and out of the central mandrel 126, thereby traversing the axial passageway 125 therein. Each sheet of backing material 134 is disposed in the mandrel 126 at a location intermediate the ends of the sheet, generally in the middle of the sheet, so as to provide two leaves of generally equal length. In the illustrated example, four leaves, 134a, 134b, 134c and 134d are used. Clearly, a lesser number, such as only two leaves, or a far larger number, such as ten or twelve or twenty leaves may also be used.

Each of the leaves of the backing material 134 is flanked by and enclosed by two adjacent sheets of semipermeable membranes 138. In the illustrated embodiment, it can be seen that the sheets of semipermeable membrane 138 extend along the entire length of sheets of backing material 134 even along the portion of the backing material 134 which is disposed within the mandrel 126, residing in the axial passageway 125 thereof. This particular arrangement facilitates economical fabrication of the sheets of backing material 134 and semipermeable membrane 138 in three-ply groups or laminates. Obviously, the semipermeable membrane 138 could be stripped from the backing material 134 along the portion that resides within the mandrel 126 so as to facilitate transfer of the fluid from the flow passageways provided by the backing material into the axial collection passageway 125 in the mandrel 126. However, from a production standpoint, it is contemplated that a plurality of perforations 140 would be made in the portion of the thre-ply laminate within the mandrel, an operation which can be performed more simply than stripping.

As best seen, in FIGURE 2, the three edges of each backing material leaf are sealed between adjacent edges of the pairs of flanking semipermeable membranes 138. The seal is simply made by applying a sufficient amount of a suitable adhesive to the three edges, 130, 131, 132 to assure that a seal is achieved and that no fluid can enter the edges of the backing material leaves 134 and thus must pass through the semipermeable membranes 138 before it can reach the passageways provided in the backing material. In mass production techniques, this adhesive is economically applied before assembly of the three-ply laminates with the mandrel 126; however, it can also be applied after the membrane lay-up (FIG. 3) is assembled.

Between each three-ply leaf, a sheet or layer of separator grid material 144 is disposed. This separator grid material, in assembled condition of the wound membrane module 114, provides feed passageways between adjacent spiral windings of adjacent three-ply leaves. The innermost edge of each sheet of separator grid material 144 is preferably bonded in a sui table manner to the periphery of the mandrel 126 so as to facilitate orderly spiral winding of the membrane module. In FIGURE 3, it can be seen that four sheets of separator grid material 144 are provided, one adjacent each of the four three-ply leaves. The upper and lower edges of the separator grid sheets 144 are completely open so as to facilitate free passage of fluid through.

In the spirally wound membrane module 114, the feed mixture is fed into the top of the separation unit 110 and enters only into the upper edges of the separator grids 144 because the adhesive bonds prevent any flow into the three-ply laminates of semipermeable membrane 138 and backing material 134. The fluid feed mixture which enters the top edges of the separator grids 144 flows generally downward therein, parallel to the axis of the central mandrel 126, and exits through the open bottom edges, finally leaving the separation unit 110 via the outlet pipe 124. Because, in the wound spiral membrane module 114, each sheet of separator grid material 144 lies between two sheets of semipermeable membrane 138, the incoming fluid feed mixture is carried to the entire surface area of all eight leaves of semipermeable membrane 138.

In the form illustrated in FIGURES 2 and 3, the central mandrel 126, could be made from a tube of suitable length, diameter and wall thickness which is slotted to provide four slots of suitable width extending downward therein to a depth of slightly greater dimension than the lateral dimension of the sheets of backing material 134 and semipermeable membrane 138. In such an instance, the three-ply laminates would simply be threaded through the slotted tube, perhaps from the open end. However, it has been found that mass production assembly of the membrane module 114 is facilitated by using, instead of a single tube with slots provided therein, a plurality of mandrel segments 142 (which in FIGURES 2 and 3 are arcuate sections of the sidewall of the tube). The mandrel segments 142 are disposed in the desired position in association with the sheets of backing material, thereby dividing each sheet into two leaves. By clamping or fastening the mandrel segments 142 together, both at the top and at the bottom, a composite, stable central mandrel 126 is provided about which the plurality of leaves can be wound to form the membrane module 114. In the illustrated embodiment, an upper cap 146 is employed which has formed therein an upward extending annular passageway 148 into which the tops of the mandrel segments 142 are interfitted. A suitable peripheral coupling ring 150 is employed to hold the mandrel segments 142 together near the lower ends thereof, beneath the lower edges 132 of the multiple-ply laminate sheets.

The lowermost portions of the ends of the mandrel segments 142 extend down inward into the coupling ring 150, which extends from the base of the membrane module 114, to some point below where the outlet pipe 118 abuts the mandrel segments 142, preferably till it abuts the circular plate 117. Any suitable means may be used to provide a good seal between the coupling ring 150, and the outlet pipe 118, one such means would employ a standard O-ring 160 at some point below the mandrel outlet pipe junction as shown in FIGURE 1. Auxiliary sealing means, such as sealing tape, may be employed. Accordingly, the axial passageway 125 through the central mandrel 126 is thus in fluid communication with the outlet pipe 118.

The selection of the semipermeable membrane material is dependent of course upon the intended use of the separation unit 110. If separation of a gaseous mixture is to be employed, a suitable semipermeable membrane is selected which affords high permeation of the desired gaseous component. The situation is similar when a liquid is to be separated from a mixture of liquids. For the separation of a solvent from a solution, an osmotic membrane is used. When it is desired to separate water from an aqueous saline solution, the cellulose acetate membrane described in the previously mentioned OSW bulletins are considered to have particular economic advantage because they exhibit excellent salt rejection characteristics while permitting above average flow rates therethrough.

The backing material 134 is made of relatively thin sheets of a material having a sufficiently high porosity to permit ready flow of fluid therethrough in the plane thereof, and being able to withstand substantial pressure in a direction generally transverse to the plane thereof without collapse or undue creep. Of course, the backing material 134 should be sufficiently flexible so that it may be wound in the spiral configuration without fracturing. If compaction of the backing material 134 should occur upon subjection to relatively high pressures, it is usually accompanied by a corresponding reduction in porosity. Such compaction and reduction in porosity increases the resistance of the backing material 134 to fluid flow therethrough, reducing the average pressure differential on opposite sides of the semipermeable membranes 138 and thus reducing the efficiency of the unit 110 at a specified set of operating conditions. Graphite cloth is one material which exhibits good qualities for a backing material; however its fairly expensive cost makes it economically unsuitable for certain operations. Silicon carbide grit, properly sized, or properly sized particles of sand, held on the surface of a sheet of plastic felt with a suitable binder is considered especially useful in high pressure operations, for example where the feed pressure may reach 1500 p.s.i. Various types felts of glass fibers fabricated in the form of thin flexible sheets also display good advantages as backing materials for certain separation processes.

In instances where a pressure of not more than about 500 p.s.i. is to be employed, various synthetic plastic fibrous materials may be used as the backing material 134. Examples of such synthetic materials include nylon, polyester, rayon, rayon viscose, and acrylic fibers. These fibers are generally unaffected by exposure to water and thus may be used in the separation of aqueous solutions as well as gases.

Whereas the backing material 134 provides the flow channels for the fluid which permeates through the semipermeable membranes, leading to the axial collecting means, the separator grid material 144 provides the passageways for the input or feed mixture. In operation, the feed mixture is pumped through the separator grid material 144 in a direction generally parallel to the axis of the mandrel 126, and therefore generally at right angles to the direction of flow of the permeating fluid, which flow is generally laterally, spirally inward through the backing material 134 to the central mandrel passageway 125. The separator grid material 144 is preferably fabricated of thin, very porous, flexible sheets which may be readily wound into spiral configuration. Because the separator material is on the high pressure side of the semipermeable membrane 138, it need not provide support, nor particularly resist compaction. In general, a relatively inexpensive woven structure, such as plastic screening material made of polyethylene, can be employed as the separator grid material 144.

The mandrel 126 can be fabricated of any relatively corrosion resistant material which is unaffected by the particular components of fluid mixtures being treated. For example, for the separation of fresh water from saline water, the mandrel 126 may be fabricated of synthetic plastic materials, such as cellulose butyrate or an extruded acrylic, both of which materials have good dimensional and structural stability in a high pressure and relatively moist environment.

The particular adhesives employed of course depend upon the particular semipermeable membranes used. In general, and in particular when cellulose acetate membranes are used, a modified epoxy resin is found to be a very suitable adhesive for bonding the edges of the semipermeable membranes 138 and backing material leaves 134 so as to prevent any inflow of the feed mixture thereinto.

The high pressure chamber 111 can be made of any corrosion-resistant material which is unaffected by the particular feed mixture intended to be treated. In general, examples of suitable materials include copper, coated mild steel, stainless steel, fiberglass-reinforced epoxy, and polyvinyl chloride. After the membrane module has been wound into its spirally wound condition, an outer wrap of plastic film may be disposed thereabout so as to hold the membrane module 114 in its tightly wound condition. In order to assure that there is a good seal between the outer lateral surface of the membrane module 114 and the interior lateral wall of the shell 112, a few turns of plastic tape (not shown) are often wrapped about the module at one or more locations to provide suitable sealing bands. Alternatively, a circumferential seal (not shown) may be provided at a suitable vertical location on the interior wall of the shell 112. These sealing bands prevent the feed mixture from by-passing the membrane module 114 in the separation unit 110 and leaking from the inlet 115 to the outlet 124 thereby reducing the effectiveness of the separation unit 110. The upper cap 146 and the lower coupling ring 150 are suitably sealed to the central mandrel 126 to prevent leakage of the feed mixture thereinto.

Although the separation unit 110 may be employed for treating a variety of feed mixtures, depending upon the particular semipermeable membranes employed, it is considered particularly adapted for the treatment of aqueous solutions, such as sea or brackish water; and its operation is briefly described hereinafter with reference to sea water. Sea water is supplied to the upper end of the chamber 111 via the inlet pipe 115 and flows downward through the various spiral windings of the separator grid material 144. After completion of its downward passage through the membrane module 114, the sea water is depleted of a portion of its original water content and has a higher salt concentration. Exit of the sea water with its increased salt concentration is via the outlet pipe 124.

Because in the separation of fresh water from sea water, pressure is maintained above the osmotic pressure of the particular semipermeable membrane used, a suitable pump (not shown) is employed to pump the sea water into the separation unit 110. Likewise, a suitable adjustable pressure control valve (not shown) is provided in connection with the outlet pipe 124 so that the desired pressure can be maintained throughout the entire membrane module 114. Preferably, the pump is adjusted to provide a relatively turbulent flow of input feed mixture through the separation unit 110 so that, when a solution such as sea water is employed, the boundary layer salt concentration in the flow stream adjacent the membrane 138 is minimal.

The semipermeable membranes 138 permit the diffusion of water therethrough into the backing material 134 wherein it flows spirally inward until it reaches the axial passageway 125 in the central mandrel 126. Of course, the water experiences a drop in pressure in its flow spirally inward through the backing material sheets. This pressure drop is generally proportional to the square of the distance the water must flow, and inversely proportional to the square of the effective hydraulic diameter of the pores in the backing material, so long as the volumetric flow per unit area of membrane is substantially constant. It is accordingly desirable to provide a backing material 134 having relatively large sized pores to minimize such pressure drops. But, because the back material also serves to support the sheets of semipermeable membranes, the pores cannot be so large as to permit the membrane 138 to be forced into the pores. The use of the plurality of backing material leaves shortens the average distance which the separated fluid component must travel to reach the axial passageway 125, and the entry of the backing material sheets 134 directly in to the axial passageway means 125 in the central mandrel 126 eliminates the possibility of a further pressure drop at this point which might reduce the efficiency of the unit 110, and facilitates its manufacture.

If desired, more than one membrane module 114 may be employed within a single separation unit 110 by connecting the top of the central mandrel 126 of a lower module to the bottom of the central mandrel 126 of the upper module. This arrangement may be of particular interest where the overall desired height of the separation unit 110 exceeds the width of the sheets of semipermeable membranes 138 which may be conveniently fabricated, so that sheets of a width about one-half the height of the unit 110 may be employed.

Illustrated in FIGURE 4, is an alternate embodiment of a membrane lay-up for a membrane module 214 wherein the 200 series of numbers are used to identify the parts which are similar to those which appear in FIGURE 3. The membrane module 214 includes a central mandrel 226 having an axial passageway 225 formed therein. The module 214 includes a plurality of sheets of backing material 234, a plurality of sheets of semipermeable membranes 238 and a plurality of separator grids 244. In the particular illustration, two sheets of backing material 234 are employed, both of which extend into and out of the central mandrel 226, thereby traversing the axial passageway 225 therein. Each sheet of backing material 234 is disposed in the mandrel 226 at a location intermediate the longitudinal ends of the sheet, generally at the middle of each sheet, so as to provide two leaves of generally equal length. In the illustrated example four leaves 234a, 234b, 234c and 234d are used. A lesser number, or a greater number, of backing sheets 234 may also be used. For example, two pairs of backing sheets 234 could be employed with a mandrel similar to mandrel 126 in FIGURE 3.

Between each of the leaves of backing material 234 is disposed a sheet 238 of semipermeable membrane material, which is folded over so as to provide a pair of leaves of semipermeable membranes. Between the two leaves of semipermeable membrane provided by each sheet 238 is disposed a sheet of separator grid material 244. As in the membrane module 114, each of the leaves of backing material 234 is sealed between the two adjacent flanking semipermeable membranes 238. In this instance, the semipermeable membrane leaves which flank each leaf 234 of backing material are parts of different, folded sheets 238 of semipermeable membrane material. As in the module 114, the seal is simply made by applying a sufficient amount of suitable adhesive to the top, bottom and outer edges of the membranes and the backing material to assure that no fluid can enter the edges of the backing material leaves. Thus, fluid must pass through a semipermeable membrane 238 before it can reach the flow passageways provided in the backing material 234. In the final spirally wound configuration of the membrane module 214, the sheets of separator grid supply the fluid feed mixture to the surface areas of the two leaves formed by the membrane sheet 238 which is folded about it.

Again, in the form illustrated in FIGURE 4, the mandrel 226 could be made from a tube of suitable dimension which is slotted to provide a diametrical slot through which the pair of sheets of backing material 234 could be threaded. To facilitate mass production assembly of the membrane module 214, it is preferred to employ a plurality of mandrel segments 242 (in the illustrated embodiment two segments 242 which are nearly two halves of a tube). After assembly about the pair of backing sheets 234, the two arcuate mandrel segments 242 are clamped top and bottom in a manner similar to that described and illustrated with respect to the module 114 in FIGURES 1 to 3. After clamping to provide a composite mandrel 226, the various leaves extending therefrom are wound spirally about the mandrel to provide a composite membrane module 214, in the same manner as described hereinbefore.

In FIGURES 5 through 7, another alternate embodiment of a membrane module is illustrated, together with a diagrammatic representation of a method for making this membrane module. Numbers in the 300 series are employed to indicate elements generally similar to those previously described in detail. As best seen in FIGURE 6, a membrane module 314 is shown which comprises a composite mandrel 326 which is made up of a plurality of mandrel segments 342 in the form of individual, generally triangular-shaped tubes. The tubular segments 342 have porous sidewalls and may be made of any suitable porous material, such as sintered metal or rigid synthetic plastic foam. In their illustrated form, the tubular segments are made of synthetic plastic and porosity is imparted by the provision of holes 347 in at least the inner two sidewalls thereof. The axially extending passageway means 325 of the composite mandrel is provided by the hollow centers of the tubular segments 342. Threaded between the individual mandrel segments 342, and thus extending into and out of the composite mandrel 326 at a plurality of locations, is a five-ply group or laminate comprising a center sheet of separator grid material 344 flanked by a pair of sheets of semipermeable membrane material 338, together with overlying and underlying sheets of backing material 334. As can be seen from FIGURE 5, and is discussed more fully hereinafter, the five-ply laminate may be fabricated in a continuous length to facilitate economical mass production.

As in the previously described membrane modules 114 and 214, the edges of the sheets of backing material 334 are sealed via the application of adhesive 336 to the adjacent edges of the sheets of semipermeable membrane 338. In addition, in this membrane module 314, the upper and lower edges of the backing sheets 334 are also sealed to the exterior sidewalls of each tubular mandrel segment 342. The six tubular mandrel segments 342 are secured in the positions shown via the use of suitable fastening or clamping means at the top and bottom thereof as in the case of membrane modules 114 and 214. As shown in FIGURE 7, an upper cap 346, which may be suitably cemented to the tops of the six tubular segments 342, blocks any flow of the fluid feed mixture into the upper ends of the tubular segments. If desired, the cap 346 may be provided with a plurality of downwardly extending ribs (not shown) which would serve to space the tubular segments 342 apart in the general positions seen in FIGURE 6.

The operation of the spiral membrane module 314 is generally the same as that previously described. The input fluid feed mixture enters the separation unit and flows generally downwardly through the passageways provided by the spiral windings of the separator grid material 344. The selective fluid component permeates through the flanking sheets of semipermeable membrane material 338 and enters the fluid passageways provided by the sheets of backing material 334. The fluid reaching the backing material 334 is conducted spirally inward to the composite mandrel 326 where it enters the axial passageway means 325 through the holes 347 provided in the walls of the tubular segments 342.

The membrane module 314 is susceptible to simple and economical mass production fabrication and assembly. As can be seen in FIGURE 5, five large supply rolls of sheet material are employed which feed the five sheets therefrom into the nip of a pair of pressure rolls 370 to create a five-ply laminate 368. The sheet of separator grid material 344 lies in the center of the five sheets, with sheets of semipermeable membrane material 338 immediately above and below it, and sheets of backing material 334 respectively above and below the semipermeable membranes to form the outside layers of the five-ply laminate 368. To prevent inflow of fluid through the edges of the backing material sheets 334 and to seal the edges of the backing material to the edges of the semipermeable membrane sheets 338, a pair of adhesive applicator stations 371 and 372 are provided. At adhesive station 371, a suitable adhesive, such as a modified epoxy resin with a catalyst mixed therewith, is applied along both edges of the lower sheet of backing material 334. Sufficient adhesive is applied so that, when hardened, a complete seal is provided along both side edges of the backing sheet 334 and the edges of the sheet are joined to the edges of the lower surface of the membrane sheet 338 which is laminated next thereabove. At the adhesive station 372, a like adhesive is applied to the upper backing sheet 334 in sufficient quantity to likewise provide a complete seal, when hardened, along both side edges of the sheet and to join the sheet to the edges of the underlying sheet of semipermeable material 338.

An adhesive is employed, such as a modified epoxy resin plus catalyst, which remains tacky long enough so that complete hardening does not occur until the membrane module 314 has been spirally wound. In this manner, the adhesive also creates a seal between the edges of the backing material sheets 334 and all three exterior surfaces of the tubular segments 342 at locations along the top and bottom thereof. Of course, excessive adhesive should not be applied which could result in adhesive reaching the separator grid material 344 and closing or partially closing the edges thereof. Generally the inherent characteristics of the semipermeable membrane material prevent passage of adhesive therethrough so that this danger is not considered to be overly important so long as careless application of adhesive is avoided. A final module fabrication step could be employed which would trim any excess material, either adhesive or sheet laminates, from each end of the module 314 after the adhesive has fully cured.

The five-ply laminate 368 which emerges from the pair of rolls 370 may be threaded between the plurality of tubular segments 342 which are held in a suitable jig. Preferably however, a sufficient length of the five-ply laminate for an individual membrane module 314 is fabricated as a continuous length and is strung in three parallel horizontal strands. In this operation, it is first passed around a movable pulley 373, then around a second movable pulley 374, and over to a stationary pulley 375 whereat connection with the end of the five-ply laminate is made by a suitable clamp 376 supported by rope passing over the pulley 375.

The pulleys 373 and 374 have the form of elongated rollers which accordingly give support to the five-ply laminate across the entire width thereof. The pulleys 373 and 374, as can be seen in FIGURE 5, are movably mounted, as by connection via suitable ropes 377 and 378 which pass over stationary pulleys 379 and 390, respectively. Preferably, after the three-strand arrangement of the continuous five-ply laminate is strung over the respective pulleys, the six tubular segments 342 are located in association with the middle portions of each strand to form the lay-up shown in FIGURE 5. In this position, the tubular segments 342 are clamped together at both ends thereof, using the cap 346 at one end, to provide the composite mandrel 326. The foregoing operation is easily performed with the strands supported in the indicated manner so that quick assembly of the membrane lay-up is simply carried out.

An alternate method of stringing the five-ply laminate 368 as shown in FIGURE 5 would cause the laminate 368 to be drawn from the supply roll by means of a suitable clamp 376. The laminate 368 would be pulled diagonally until it reaches pulley 375 as shown in FIGURE 5. At this point pulley 374 which would be initially located slightly above and to the left of the pressure rollers 370 shown in FIGURE 5 would be caused to move in a generally downward direction drawing laminate 368 with it until it reaches the position shown in FIGURE 5. When pulley 374 reaches the desired position, pulley 373, which initially is situated in a position above and to the side of pulley 374 opposite the side where pulley 375 is located, will be moved across, drawing with it the laminate 368, until pulley 373 attains the position shown in FIGURE 5. This operation will eliminate the need for threading the laminate 368 around the pulley which would afford additional production assembly economies.

The various strands of the five-ply laminate 368 are held in slight tension via the tensioning means attached to the movable pulleys 373 and 374 and to the clamping means 376. The tensioning means is diagrammatically illustrated in FIGURE 5 by weights hanging from the ropes connected to the pulleys and clamp. Obviously, any suitable tensioning means can be employed, preferably one which permits longitudinal movement of the items being maintained in tension.

Before winding the six leaves of the five-ply laminate 368 about the composite mandrel 326, the end of the uppermost righthand leaf may be severed from the laminate emerging from the pressure rolls 370 and, if desired, supported via a clamp and pulley arrangement similar to clamp 376 and pulley 375. Alternatively, the winding of the membrane module may be synchronized with the production of the five-ply laminate so that severing need not be carried out until the spiral winding is essentially complete.

By maintaining tension on the strands throughout substantially the entire winding of the spiral membrane module 314, it is assured that the various leaves are wound evenly about the composite mandrel 326. In the method illustrated in FIGURE 5, winding is carried out in a clockwise direction. When the winding is essentially complete and the movable pulleys 373 and 374 and the clamp 376 are disposed generally adjacent the outer periphery of the spiral windings, rotation of the composite mandrel 326 is halted and the leaves are released from association with the pulleys 373 and 374 and the clamp 376. A detachable connection may be provided between the rope 377 and the pulley 373 (and the rope 378 and the pulley 374) so as to permit the pulley 373 to be withdrawn axially from the fold of the strands of the five-ply laminate. Alternatively, the five-ply laminate 368 may be severed at generally the apex of the fold to release the movable pulley. In the latter instance, the outer severed ends of five-ply laminate, and also the ends of the other leaves, are sealed to prevent fluid flow into or out of the edges thereof at the outer lateral surface of the spirally wound module.

In the membrane module 314, the outer lateral surface area of the spirally wound membrane leaves is isolated from the inflow and outflow of fluid feed mixture, and any suitable method may be used to accomplish this isolation. For example, the outer ends of the separator grids 344 may be sealed between adjacent membranes 338 and the lateral surface of the spirally wound membrane module tightly wrapped with an impervious film having a pressure sensitive surface or an adhesive quality that is sealed at its overlapped edges. A similar seal to that discussed previously could then be employed within the separation unit 110 in order to prevent bypass of the membrane module 314 by the feed mixture.

Although the membrane module 314 has been illustrated with reference to three strands of five-ply laminate, which produce six generally radially extending leaves, it should be clear that a greater or lesser number of strands, as for example, two strands or five strands, may be employed. It should be apparent that the larger number of leaves used, the more advantageous is the above-described method which permits the systematic, orderly, and economical fabrication of a membrane module employing such a plurality of leaves.

Still another alternate embodiment of a membrane module is illustrated in FIGURES 8 to 10. A membrane module 414 is shown which comprises a central mandrel 426 which contains axial extending passageway means 425 in the form of a plurality of peripheral cavities. Each cavity has a cross sectional shape approximately that of a teardrop. As best seen in FIGURE 9, a laminated sheet composed of backing material 434 and membrane 438 extends into each cavity 425 in the mandrel 426 and is generally disposed between the sidewall of the cavity and an insert 428 about which it is wrapped.

The inserts 428 have the general shape of the teardrop cavities but are sufficiently smaller in size so as to fit into a cavity 425 with the laminate sheet material 468 wrapped therearound. The inserts 428 are elongated and have a length slightly longer than the width of the associated sheets. Preferably, the cavities 425 are so shaped that once the inserts 428 and associated sheet material have been fit thereinto, they will not be inadvertently removed. This may be accomplished, for example, by forming the cavities 425 so axial insertion is required or by making the mandrel of suitable resilient material, such as synthetic plastic, and forming the inserts 428 so they are laterally snapped thereinto. In the illustrated embodiment, each of the inserts 428 is made of suitable material, such as synthetic plastic, and includes an axially extending hole 449 which is connected along the length thereof with the outer surface of the insert via generally radially extending holes or perforations 447. The holes 447 accordingly connect the flow passageway-providing sheets of backing material 434 in fluid communication with the axially extending hole 449. Alternatively, the inserts 428 may be formed of a porous material, such as sintered metal or rigid foamed plastic.

As best seen in FIGURE 9, a thin sheet of semipermeable membrane material 438 is disposed adjacent one surface of the backing material 434, being bonded thereto along the upper and lower edges thereof, and being also constrained between the cavity sidewalls and the insert 428. This arrangement facilitates the passage of fluid from the backing material 434 into the center hole of 449 via the plurality of radial holes 447 which are positioned up and down the length of the insert 428. A sheet of separator grid material 444 is disposed adjacent the surface of each of the semipermeable membrane sheets 438 (see FIGURE 8) and serves to provide generally vertically extending passageways through which the fluid feed mixture is supplied both to the surface of the above-mentioned semipermeable membrane sheet 438 and to the sheet 438 emanating from the next adjacent cavity 425. All edges of the laminate sheets 468 are suitably sealed so as to prevent any inflow thereinto of the feed mixture from the separator grid material 444.

Each insert 428 with its associated sheet of backing material 434, pair of sheets of semipermeable membrane material 438, and sheet of separator grid material 444 is referred to as a membrane module subassembly. As should be apparent from FIGURE 9, each membrane module subassembly can be individually assembled as a complete unit so that to assemble the complete membrane module 414 it is only necessary to take the desired number of subassemblies and insert them into the respective cavities 425 in the mandrel 426 and then wrap the plurality of composite leaves spirally thereabout. The outer lateral surface of the membrane module 414 is wrapped in the same general manner as described above with reference to the module 114 illustrated in FIGURES 2 and 3.

To seal the upper ends of the axial passageways 449 within the cavities 425, a suitable cap 446 is affixed to the top of the mandrel 426. The illustrated cap 446, as best seen in FIGURE 10, contains a depending thin-walled skirt 448 of sufficient diameter to fit snugly around the lateral surface of the mandrel 426 and the outer lateral arcuate surfaces of the inserts 428 when they are installed in the cavities 425. The inserts 428 may be fabricated so that they are longer than the membrane sheet and extend together with the mandrel 426 above the membrane sheets, such that the cap 446 when affixed to the top thereof will rest on the mandrel 426 and insert 428 and seal the axial passageways 449 from the feed fluid. Obviously, other cap designs could be employed. For example, the cap 446 might have a generally flat circular top portion and include a suitable number of depending generally teardrop-shaped plugs which would fit into the upper ends of the cavities 425 and abut and seal the top ends of the inserts 428.

From the above description and discussion, it should be apparent that the design of the membrane module 414 lends itself to mass production techniques because of the separate relatively simple assembly of the individual subassemblies which can then be installed in the mandrel 426 as a part of a subsequent separate fabrication operation. It should also be clear that this technique, although illustrated and discussed with reference to the module 414 shown in FIGURES 8 to 10 wherein only two membrane subassemblies are employed, has still further advantages in simplifying the fabrication of a membrane module employing a larger number of flow passageway-providing sheets of backing members 434. To illustrate this fact, FIGURE 11 is provided which shows a mandrel 426' including ten equally spaced peripheral cavities 425'.

It should be realized that the advantages which flow from the simplicity of the assembly operation for the membrane module 414 shown in FIGURE 8 are magnified when a membrane module is fabricated using a mandrel 426'.

The operation of the separation apparatus 110 is generally the same regardless of which of the membrane modules (114, 214, 314 or 414) is used therein. For example, when a mixture of gas is to be separated, the feed mixture is fed into the top of the unit through the inlet 115 and flows to the bottom of the unit through the passageways provided by the separator grid material. Throughout its downward passage through the unit, a fraction of the gas mixture diffuses through the membrane sheets and eventually reaches the axial collection passageway in the center of the mandrel and exits from the separation unit 110 via the lower outlet pipe 118. The feed mixture, minus the diffused gas or gases, exits via the side outlet pipe 124.

The operation is similar when a mixture of liquids or a fluid solution containing a solvent and solute is separated. For example, if in the latter instance the separation of fresh water from sea water is performed, suitable osmotic membranes are employed. The sea water is pumped into the unit through the inlet 115 at a sufficiently high pressure. The permeated fresh water leaves via the bottom outlet 118, and the more concentrated sea water exits via the side outlet 124. If, for example, fruit juice is concentrated, the fruit juice is fed into the top of the unit 110 via the inlet passageway 115, water exits via the bottom outlet pipe 118, and the concentrated fruit juice exits via the side outlet 124.

Although the invention has been illustrated with reference to various embodiments of separation apparatus and methods for the fabrication thereof, it should be apparent to those skilled in the art that obvious modifications can be made to these embodiments without deviating from the spirit of the invention, and these modifications are deemed to be within the scope of the invention which is defined only by the appended claims.

Although the description has generally contained reference to the semipermeable membranes and to the backing material and to the separation material as being separate and distinct sheets before their incorporation into the module, this need not necessarily be the case even though it is presently considered to be the most convenient and economical. For example, one of the layers, as for instance the semipermeable membrane, might be made first, and then the backing material layer and the separator layer deposited thereon, as perhaps by extruding a layer of foamed synthetic plastic or other suitable material in association therewith. Conceivably, engineering practices may some day permit the initial extrusion of a multiple-ply laminate wherein one or more of the layers has the properties of the semipermeable membrane. Moreover, the dual layer osmotic membranes described previously inherently include two distinct layers or sheets and thus may potentially be used as a composite membrane-backing material. To permit this adaptation, it is believed that the strength of the porous layer need merely be increased so that it will resist compaction by the operating pressure differential and thus will continue to provide in the plane thereof adequate flow passageways throughout separation operation.

Various features of the invention are set forth in the following claims.

What is claimed is:

1. A membrane module for use in apparatus for separating a first fluid component from a mixture of the first fluid component and a second component, which module comprises a mandrel having axial passageway means provided therein, a plurality of leaves of sheetlike backing material extending generally radially outward from said mandrel, said sheetlike backing material being porous and providing a passageway for fluid flow in the plane thereof, a sheet of semipermeable membrane disposed adjacent at least one surface of each of said leaves of sheetlike material to provide groups of a sheetlike leaf and adjacent membrane, said semipermeable membrane permitting passage of the first fluid component therethrough while restricting passage of the second component therethrough, said sheetlike leaves and said adjacent membranes being spirally wound upon said mandrel, and means for providing feed passageways between adjacent spiral windings of said groups of leaves and adjacent membranes, one sheet of said flow-passageways providing backing material extending into said mandrel at one peripheral location to provide fluid communication between said axial passageway means and said flow passageways and out of said mandrel at a different peripheral location on said mandrel to thus form at least two generally radially extending leaves.

2. A module in accordance with claim 1 wherein said leaves extend into said axial passageway means in said mandrel.

3. A module in accordance with claim 1 wherein said mandrel is formed of a plurality of mandrel segments.

4. A module in accordance with claim 3 wherein said mandrel segments are sections of a tube.

5. A module in accordance with claim 3 wherein said mandrel segments are individually tubular in shape.

6. A module in accordance with claim 5 wherein said mandrel segments are individual porous tubes generally triangular in cross section.

7. A module in accordance with claim 6 wherein said generally triangular tubes have perforations in at least one sidewall thereof.

8. A module in accordance with claim 1 wherein said adjacent sheet of semipermeable membrane also extends into and out of said mandrel at different peripheral locations.

9. A module in accordance with claim 8 wherein a pair of sheets of semipermeable membrane are provided in flanking relation to said one layer of backing material and wherein the portions of said flanking sheets of membranes within the confines of said mandrel are perforated.

10. A module in accordance with claim 1 wherein at least two layers of backing material extend into and out of said mandrel at different peripheral locations and two sheets of semipermeable membranes are disposed between adjacent leaves of said backing material layers and a layer of feed-passageway-providing separator material is disposed intermediate each of said last-mentioned two-sheet membrane pairs.

11. A module in accordance with claim 10 wherein said two sheets of membranes and said intermediate layer of separator material also extend transversely through said mandrel between said layers of backing material.

12. A module in accordance with claim 11 wherein said mandrel is formed of a plurality of mandrel segments which are individually tubular shape.

13. A module in accordance with claim 12 wherein said mandrel segments are individual porous tubes generally triangular in cross section.

14. A method of making a membrane module for use in a separation apparatus designed to separate a first fluid component from a fluid mixture including the first fluid component and a second component, which method comprises providing two continuous sheets of backing material of sufficient porosity to provide a passageway for fluid flow in the plane thereof, providing two continuous sheets of semipermeable membrane of width approximately equal to the width of the backing sheets, associating one backing sheet with each of said continuous sheets of membrane and applying adhesive to both lateral edges of each of said backing sheets so as to seal the lateral edges of each backing sheet to fluid flow therethrough and join said lateral edges to the respective edges of the associated membrane sheet, providing a continuous sheet of porous feed-passageway-providing separator material, associating said continuous sheets in a five-ply laminate with said separator sheet in the center thereof adjacent each of said membrane sheets, disposing segments of a central mandrel on opposite sides of a length of the five-ply laminate at a location intermediate the ends thereof so the laminate forms at least two leaves extending generally radially outward from the segmental mandrel connecting the segments to form a composite mandrel and winding the leaves spirally about the composite mandrel.

15. A method in accordance with claim 14 wherein the five-ply laminate is folded over and wherein at least four mandrel segments are employed so that the five-ply laminate enters and leaves the composite mandrel at a total of four locations providing four leaves extending generally radially from the central mandrel.

16. A method in accordance with claim 15 wherein mandrel segments in the form of porous tubes are employed.

17. A method in accordance with claim 14 wherein the leaves are held in tension while said spiral winding is performed.

18. A method in accordance with claim 14 wherein said connecting is performed between portions of said segments which extend beyond the lateral edges of the laminate.

19. A membrane module for use in apparatus for separating a first fluid component from a mixture of the first fluid component and a second component, which module comprises a central mandrel having a plurality of axially extending cavities therein each of which cavities opens onto the lateral periphery of said mandrel at a different location, said cavities extending generally parallel to one another, and a plurality of integral subassemblies each having one portion fitted within one of said cavities and another portion extending exterior thereof through the peripheral opening, each subassembly including an elongated insert which is disposed at least partially within said cavity, a layer of backing material connected to said insert having a portion which extends into said mandrel cavity and is disposed between said insert and the sidewall of said cavity, the remainder of said backing sheet constituting a leaf extending generally radially outward from said central mandrel, a sheet of semipermeable membrane disposed adjacent one surface of said backing material leaf, a layer of porous feed-passageway-providing separator material disposed adjacent the opposite surface of said sheet of membrane, said backing layer and said membrane sheet of each subassembly being spirally wound upon said mandrel with said separator material in overlapping relation, said separator material providing an axially extending feed passageway system adjacent each spiral winding of said semipermeable membranes.

20. A module in accordance with claim 19 wherein, in each subassembly, a sheet of semipermeable membrane is disposed adjacent both surfaces of said backing material leaf.

21. A module in accordance with claim 19 wherein each subassembly contains a composite laminate of said semipermeable membrane sheet and said backing material layer which laminate is folded upon itself around said insert in laterally surrounding relation thereto with said backing material adjacent the lateral surface of said insert.

22. A module in accordance with claim 21 wherein a cross sectional dimension of a portion of said insert is of sufficient size so that the insert togther with its surrounding composite laminate cannot be withdrawn radially from the peripheral opening of said cavity without deformation of said mandrel.

23. A module in accordance with claim 22 wherein the cross sectional shape of said insert is substantially the same as the cross sectional shape of said cavity.

24. A module in accordance with claim 23 wherein said cross sectional shape is generally that of a teardrop.

25. A module in accordance with claim 19 wherein each insert includes an axially extending hole which hole is in fluid communication with the lateral surface of said elongated insert.

References Cited

UNITED STATES PATENTS 1,825,983  10/1931  Sweetland _____ 210—494 X
1,909,308  5/1933  Nugent _____ 210—487 X

FOREIGN PATENTS 528,003  8/1921  France.
555,471  3/1923  France.

OTHER REFERENCES

Merten et al.: "Research and Development on Reverse Osmosis Membrane Modules," from U.S. Dept. of Interior, Office of Saline Water Research and Development, Progress Report No. 165, 65 pp., pp. 28 and 32 relied on.

REUBEN FRIEDMAN, *Primary Examiner.*

F. SPEAR, *Assistant Examiner.*